2,801,228

EPOXY RESIN COMPOSITIONS CURED WITH METALLIC SALTS OF ENOL-KETO TAUTOMERIC COMPOUNDS

Hans Starck and Felix Schlenker, Wiesbaden, Germany, assignors to Chemische Werke Albert, Wiesbaden-Kastel, Germany, a corporation of Germany No Drawing. Application October 10, 1952, Serial No. 314,216

Claims priority, application Germany October 25, 1951

9 Claims. (Cl. 260—47)

This invention relates to epoxy or ethoxylin resin compositions and to their production, and more particularly to such compositions having combined with the resin component novel hardening agents which may be defined broadly as polyvalent metal salts of compounds of tautomeric reaction.

It has heretofore been suggested that ethoxyline resins be mixed with various catalysts such as, for example, hydroxides of alkaline earth metals, diethyl amines, piperidine, triethanolamine, cyanamide and its polymerization products, polyamines of various types, phthalic acid anhydride, maleic acid anhydride and its derivatives and the like.

These hardening agents known up to the present time have a number of disadvantages adversely limiting the extent of utility of the resin compositions produced. For example, all of the numerous known catalysts impart to the ethoxylin resins, whether in solution or not, the objectionable quality of instability in storage, the reason being that these catalysts react prematurely with the resin and decrease its solubility or increase its melting point to a prohibitively high level. A number of these known catalysts also have the objectionable quality of imparting undesirable color to the resin films and limit the utliity of the resins particularly in the coating field.

An object of the present invention is to produce hardenable ethoxylin resin compositions which are stable in storage. Another object is to provide such resin compositions which contain hardening agents leading to hardened compositions unaltered in color by the presence of the hardening agent. Another object is to provide hardened ethoxylin resins which possess superior resistance to solvents and other desirable qualities, as elasticity.

The ethoxylin resin compositions of the present invention have combined with the resins, as hardening agents, salts of compounds of tautomeric reaction which are capable of forming enolic and ketolic hydroxyl groups, the metal of which can be easily split off and is selected from the group consisting of aluminum, nickel, cobalt and copper. Suitable compounds are acetoacetic ester, malonic acid ester, and beta diketones, such as acetylacetone, formyl acetophenone, formylacetone and other formyl compounds. Specific examples are the aluminum salt of acetoacetic ester, $Al(C_6H_9O_3)_3$, the cobalt compound of acetoacetic ester, $Co(C_6H_9O_3)_2$, the nickel salt of acetoacetic ester, $Ni(C_6H_9O_3)_2$, copper formylacetophenone, and nickel acetylacetone.

These organo-metal hardening agents may be incorporated in the ethoxylin resins in any desired way and in any desired amount (as 5–40%, in relation to the resin content), and can be introduced with or without the help of solvents. Alternatively the said hardening agents may be incorporated at elevated temperatures by melting the resin and the catalyst together. In the mixing operation the catalyst combines or reacts with the resin to such an extent that the catalyst does not crystallize out upon cooling of the molten mixture, such result being obtained when the mixture is heated to temperatures above 130° C. When the hardening catalyst is incorporated in the resin by means of solvents, the catalyst may be in dissolved form and may be added to the resin in dissolved or undissolved form.

The product and process of the present invention contemplate ethoxylin resins (also known as polyepoxy resins) as a class, for not only may the conventional ethoxylin resins be hardened through utilization of the catalysts herein defined, but also the ethoxylin resins of more unusual composition. Suitable resins are those obtained by the reaction of polyhydroxy phenols, as the dihydroxy, diphenyl compound of Example 1 and the resorcin of Example 4 below, on the one hand, with dichlorohydrin and epichlorohydrin on the other. Those resins which contain in addition to their ethylene oxide group also one or more other functional groups such as for example, phenolic or alcoholic hydroxyl groups are contemplated, as well as the simple resins. The invention also contemplates use of mixed polymeric compounds composed of polyepoxy compounds with monoepoxy compounds of which glycid phenol ether is an example.

Example 1

One hundred parts by weight of an ethoxylin resin, prepared in known manner from 1 mol of p,p'-dihydroxydiphenyl dimethylmethane and 1,3-dichlorhydrine, are mixed at 140° C. with 8 parts by weight of aluminum acetoacetic ester, $Al(C_6H_9O_3)_3$, and maintained at this temperature for five minutes, whereupon the molten mass is cooled to normal or room temperature.

The surfaces to be joined are coated with the resin composition thus prepared. After the surfaces are joined, the resulting material is hardened for two hours at 120° C. without the application of pressure. As a result, a very strong bond of the respective materials is obtained. The metal-resin composition of this example, therefore, is very effectively employed as an adhesive or gluing agent.

Example 2

One hundred parts by weight of an ethoxylin resin prepared in known manner from p,p'-dihydroxydiphneyl dimethylmethane are dissolved in 100 parts by weight of ethyleneglycol, in which 15 parts by weight of aluminum acetoacetic ester have previously been dissolved. By applying the resulting composition to a metal surface and hardening for 30 minutes at 180°, a coating distinguished by outstanding hardness, colorless character and gloss, is obtained.

Example 3

One hundred parts by weight of the ethoxylin resin described in Example 1, are mixed with 12 parts by weight of cobalt acetoacetic ester, $Co(C_6H_9O_3)_2$, and reacted with the resin in the manner referred to in Example 1. Because of the presence of cobalt, the product thus treated, having a weak violet coloration, is particularly suitable for use as an adhesive and gluing agent.

Example 4

Eighty parts by weight of an ethoxylin resin prepared in known manner from resorcin and epichlorhydrine, are reacted at 140–150° C. with the copper compound of formylacetophenone. Films obtained by coating with this product have a pale yellow color and are completely hardened after heating at 180° C. for 30 minutes.

Example 5

One hundred parts by weight of the ethoxylin resin described in Example 1 are reacted at 140° C. with 13 parts by weight of nickel acetylacetone. Films prepared from this composition heated at 180° C. for 30 minutes, are completely hardened.

*Example 6*

One hundred parts by weight of a solid ethoxylin resin prepared from 1 mol of p,p'-dihydroxdiphenyl dimethylmethane and 1.5 mols of epichlorhydrine, are reacted at 140° C. with 9 parts by weight of aluminum acetoacetic ester, Al(C$_6$H$_9$O$_3$)$_3$. Upon cooling, a solid resin containing the incorporated hardening agent is obtained, which is particularly suitable in this form for use as an adhesive and for lacquer coatings.

The hardenable ethoxylin resin compositions of the present invention are outstanding in their stability in storage. The compositions containing colorless metal ions, and particularly the ions of aluminum, yield colorless and surprisingly bright products.

In comparison with the resin compositions containing known hardening agents, the instant compositions have advantages as to hardening period, elasticity and the surface quality of the films produced therefrom. Furthermore they do not have the objectionable quality of becoming sticky at summer temperatures, for the introduction of the hardening agents of the present invention into solid ethoxylin resins brings about practically no lowering of the melting point of the resins.

The hardened ethoxylin resins of the present invention have a high resistance to solvents to a degree far superior to those obtainable from ethoxylin resins hardened by means of agents heretofore known.

It should be understood that the present invention is not limited to the compositions, conditions and procedures herein described but that it extends to all equivalents which will occur to those skilled in the art upon consideration of the general teachings of the instant specification or of the scope of the claims appended hereto.

We claim:

1. An epoxy resin composition derived by the reaction of a polyhydroxy phenol with a compound selected from the group consisting of dichlorohydrine and epichlorohydrine, having combined with such resin, as a hardening agent, a salt of an enol-keto tautomeric compound selected from the group consisting of acetoacetic acid ester, malonic acid ester, acetyl acetone, formyl acetophenone and formyl acetone, the metal of which can be easily split off and is selected from the group consisting of aluminum, nickel, cobalt and copper.

2. A hardenable epoxy resin composition derived by the reaction of a polyhydroxy phenol with a compound selected from the group consisting of dichlorohydrine and epichlorohydrine, containing as a hardening agent, a salt of an enol-keto tautomeric compound selected from the group consisting of acetoacetic acid ester, malonic acid ester, acetyl acetone, formyl acetophenone and formyl acetone, the metal of which can be easily split off and is selected from the group consisting of aluminum, nickel, cobalt and copper.

3. An epoxy resin composition derived by the reaction of a polyhydroxy phenol with a compound selected from the group consisting of dichlorohydrine and epichlorohydrine, hardened by the action upon the resin during heating of a salt of an enol-keto tautomeric compound selected from the group consisting of acetoacetic acid ester, malonic acid ester, acetyl acetone, formyl acetophenone and formyl acetone, the metal of which can be easily split off and is selected from the group consisting of aluminum, nickel, cobalt and copper.

4. A dihydric phenol-epichlorohydrine resin composition having combined with said resin the aluminum salt of acetoacetic ester, as a hardening agent.

5. A dihydric phenol-epichlorohydrine resin composition having combined with said resin the aluminum salt of malonic acid ester, as a hardening agent.

6. A dihydric phenol-epichlorohydrine resin composition having combined with said resin the aluminum salt of a beta diketone, as a hardening agent.

7. A dihydric phenol-epichlorohydrine resin composition having combined with said resin the aluminum salt of a formyl ketone, as a hardening agent.

8. A dihydric phenol-epichlorohydrine resin composition having combined with said resin the cobalt salt of formyl acetophenone, as a hardening agent.

9. A process for hardening epoxy resins derived by the reaction of a polyhydroxy phenol with a compound selected from the group consisting of dichlorohydrine and epichlorohydrine, which comprises heating the hardenable epoxy resin composition in the presence of a salt of an enol-keto tautomeric compound selected from the group consisting of acetoacetic acid ester, malonic acid ester, acetyl acetone, formyl acetophenone and formyl acetone, the metal of which can be easily split off and is selected from the group consisting of aluminum, nickel, cobalt and copper.

References Cited in the file of this patent 511,927     Belgium _____ June 30, 1952